UNITED STATES PATENT OFFICE.

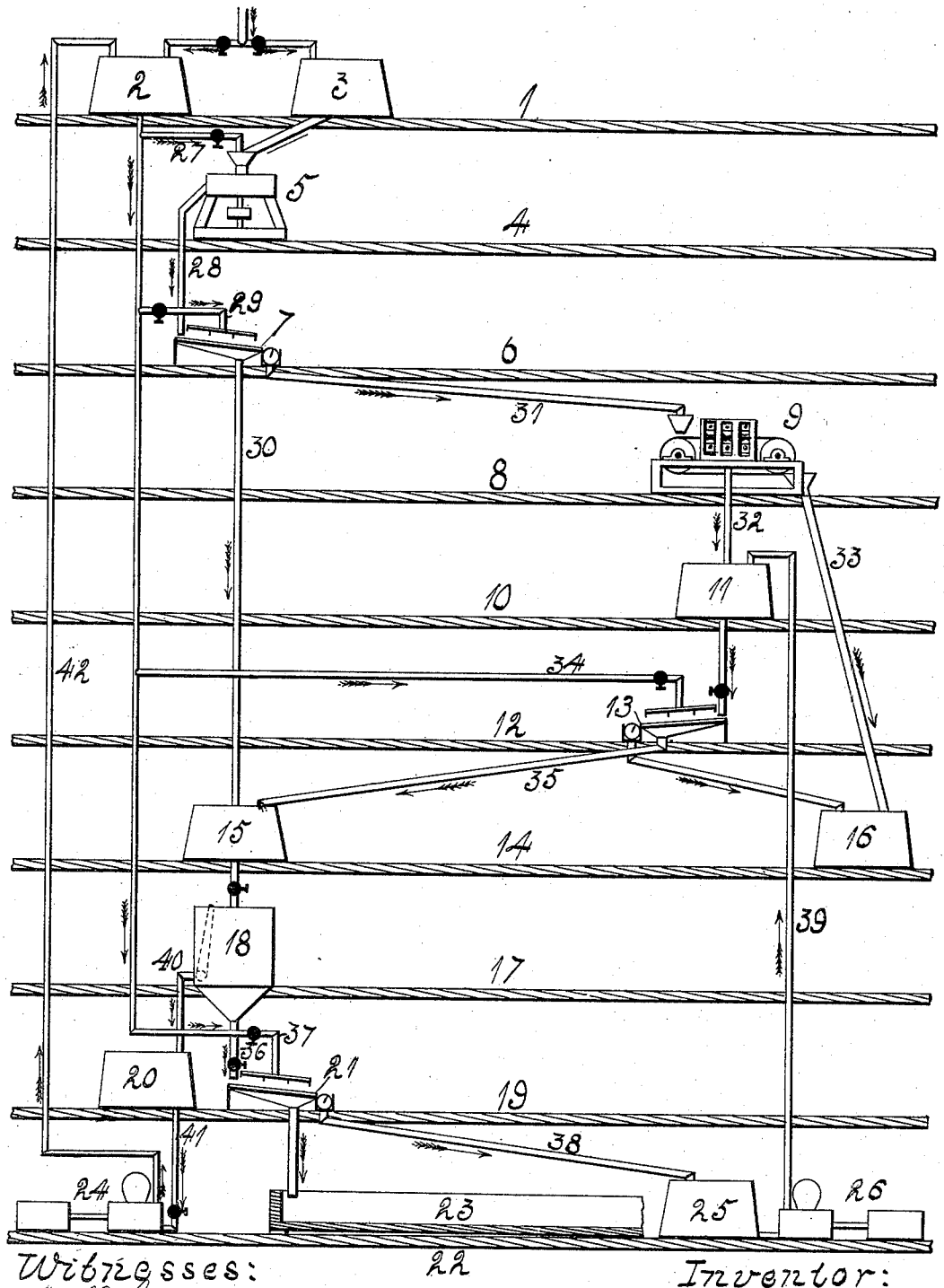

JOHN G. O'NEILL, OF ROCKFORD, ILLINOIS, ASSIGNOR TO THE ROCKFORD SUGAR REFINING COMPANY, LIMITED, OF SAME PLACE.

PROCESS OF AND APPARATUS FOR MANUFACTURING STARCH.

SPECIFICATION forming part of Letters Patent No. 584,399, dated June 15, 1897.

Application filed December 7, 1896. Serial No. 614,844. (No model.)

*To all whom it may concern:*

Be it known that I, JOHN G. O'NEILL, a citizen of the United States, residing at Rockford, in the county of Winnebago and State of Illinois, have invented certain new and useful Improvements in the Manufacture of Starch, of which the following is a specification.

This invention relates to improvements in the manufacture of starch; and it consists in treating the corn from which the starch is made to certain steps in order that all of the starch particles may be saved.

In the accompanying drawing is shown an arrangement or apparatus for treating the corn in producing starch therefrom.

The apparatus is located on different floors in order that gravity may be used to convey the corn and starch milk through the different steps as far as possible.

Upon the top floor 1 is located a water-supply tank 2 and a steep-tank 3. Upon the next floor 4 is located a mill 5. Upon the next floor 6 is located the first shaker 7. Upon the next floor 8 is located a slop-machine 9. Upon the next floor is located a tank 11, receiving the starch milk from the slop-machine. Upon the next floor 12 is located the third shakers 13. Upon the next floor 14 is located two tanks 15 and 16, the former receiving the starch liquor from the first shaker and the latter the hulls from the third shaker and slop-machine. Upon the next floor 17 is located a settling-tank 18. Upon the next floor 19 is located a tank 20, receiving the light liquor from the settling-tanks and the second shaker 21, and upon the first floor 22 is located a starch-table 23, a pump 24, and a tank 25, receiving the hulls from the second shakers, and a pump 26.

The corn is steeped in the tank 3 upon the top floor, and when sufficiently softened it is fed to the mill 5, together with a stream of water from the water-tank 2, by a pipe 27. From the mill the ground corn passes by pipe 28 onto the head of the first shaker 7, when the greater portion of the starch is washed from the hulls by the action of a stream of water fed through the pipe 29. The starch liquor passing through the shaker is conveyed through pipe 30 to the tank 15. The hulls are conveyed by a pipe 31 to the slop-machine, where the liquor is expressed and is conveyed to the tank 11 by a pipe 32. The hulls are conveyed by a pipe 33 to a tank 16. The starch milk from the tank 11 is fed onto the head of the third shakers 13, when it is washed by a stream of water supplied by pipe 34, the liquor passing through the shaker conveyed by a pipe 35 to the tank 15, when it is mixed with the liquor from the first shaker 7. This combined liquor goes to a settling-tank 18, where the heavy portion of the liquor settles to the bottom and is fed by a pipe 36 onto the head of the second shaker 21. A supply of water may be furnished by the pipe 37 to separate the starch from any particles of hulls that may have passed into the cone, the starch liquor from the second shaker being deposited upon the starch-table 23, where the starch is collected, and the gluten passing over the end of the table. The particles of hulls from the second shaker are conveyed to a tank 25 by a pipe 38, and a pump 26 pumps them up into the tank 11 by a pipe 39, where they are mixed with the starch liquor from the slop-machine and fed onto the head of the third shaker and finally pass into the tank 18.

The light liquor from the settling-tank is siphoned off and conveyed by a pipe 40 to the tank 20 and by pipe 41 to the pump 24 and by pipe 42 from the pump to the tank 2, when it mixes with the water-supply and goes through the various steps enumerated.

By this manner of manufacturing starch all of the starch particles are saved, and by the employment of the settling-tank the liquor is concentrated to the proper density to run upon the tables after passing through the second shakers, and should the light liquor of the settling-tank be siphoned or drawn off before all the starch has had time to settle the starch particles cannot escape, as the water containing them is run through the various steps, and all the starch particles must eventually form a part of the heavy liquor of the settling-tank and run onto the tables.

I claim as my invention—

1. The process of manufacturing starch and other products from corn, consisting in producing starch milk, allowing the starch to settle, the supernatent water containing chemical ingredients in solution and carrying starch and oil in suspension again used for grinding corn or supplying the sieves with water, the starch particles again entering the settlers.

2. In the manufacture of starch, the herein-enumerated steps consisting of steeping the corn, grinding the steeped corn in water, passing the ground corn over a shaker, the starch milk passing through the shaker conveyed to a tank where it is allowed to settle, the heavy liquor run onto the tables and the light liquor containing starch particles conveyed to a tank and mixed with fresh water and finally forming part of the heavy liquor of the settling-tank.

3. In an apparatus for manufacturing starch and other products from corn consisting of a tank in which the corn is steeped, a mill for grinding the steeped corn, a sieve separating the hulls and food products from the starch particles of the ground corn, a settler for separating the starch particles from the gluten after it has passed over the sieve, a tank receiving the overflow of the settler, and a pump having a connection with the last-mentioned tank for carrying the overflow of the settler to the mill or sieve or both.

JOHN G. O'NEILL.

Witnesses:
H. I. HARDIN,
A. O. BEHEL.